(12) United States Patent
Chen et al.

(10) Patent No.: US 10,915,402 B2
(45) Date of Patent: Feb. 9, 2021

(54) SOFTWARE FAULT MONITORING

(71) Applicant: Apple Inc., Cupertino, CA (US)

(72) Inventors: Zhimin Chen, San Jose, CA (US); Timothy R. Paaske, Cupertino, CA (US); Yannick L. Sierra, San Francisco, CA (US); Anish C. Trivedi, San Jose, CA (US)

(73) Assignee: Apple Inc., Cupertino, CA (US)

( * ) Notice: Subject to any disclaimer, the term of this patent is extended or adjusted under 35 U.S.C. 154(b) by 149 days.

(21) Appl. No.: 16/129,726

(22) Filed: Sep. 12, 2018

(65) Prior Publication Data

US 2020/0081785 A1    Mar. 12, 2020

(51) Int. Cl.
*G06F 11/00* (2006.01)
*G06F 11/14* (2006.01)
*G06F 11/34* (2006.01)
*G06F 11/30* (2006.01)

(52) U.S. Cl.
CPC ........ *G06F 11/1407* (2013.01); *G06F 11/302* (2013.01); *G06F 11/348* (2013.01)

(58) Field of Classification Search
CPC ............................ G06F 11/1407; G06F 11/348
See application file for complete search history.

(56) References Cited

U.S. PATENT DOCUMENTS

| | | | | |
|---|---|---|---|---|
| 5,655,115 A * | 8/1997 | Shen | ...................... | G06F 9/3004 712/239 |
| 6,058,491 A | 5/2000 | Bossen et al. | | |
| 6,247,118 B1 * | 6/2001 | Zumkehr | .............. | G06F 9/3861 712/228 |
| 6,826,715 B1 * | 11/2004 | Meyer | ................. | G06F 11/2289 713/1 |
| 7,082,553 B1 | 7/2006 | Wang | | |
| 8,255,745 B2 * | 8/2012 | Ferren | ................. | G06F 11/0721 713/322 |
| 8,782,435 B1 * | 7/2014 | Ghose | ................... | G06F 9/3834 713/190 |
| 2001/0025338 A1 * | 9/2001 | Zumkehr | .............. | G06F 9/3867 712/228 |
| 2004/0260678 A1 * | 12/2004 | Verbowski | ............ | G06F 11/079 |
| 2007/0050672 A1 * | 3/2007 | Mangione-Smith | ........................ | G06F 1/3203 714/10 |
| 2009/0132853 A1 * | 5/2009 | Ferren | ................. | G06F 11/1407 714/19 |

(Continued)

FOREIGN PATENT DOCUMENTS

WO        9722046        6/1997

*Primary Examiner* — Jonathan D Gibson
(74) *Attorney, Agent, or Firm* — Kowert, Hood, Munyon, Rankin & Goetzel, P.C.

(57) ABSTRACT

A method for verifying program flow during execution of a software program in a computer system is disclosed. Program code of the software program includes multiple program instructions and checkpoint data structures, where a given checkpoint data structure is associated with a given program instruction and is linked to at least one other checkpoint data structure. A fault monitor circuit may receive a particular checkpoint data structure and compare the particular checkpoint data structure to a previously received checkpoint data structure that is associated with another program instruction. Based on results of the comparison, the software fault monitor circuit may signal a program flow error.

20 Claims, 9 Drawing Sheets

(56) References Cited

U.S. PATENT DOCUMENTS

| | | | |
|---|---|---|---|
| 2014/0082327 A1* | 3/2014 | Ghose | G06F 11/00 |
| | | | 712/205 |
| 2015/0212906 A1* | 7/2015 | Gschwind | G06F 3/0673 |
| | | | 714/15 |
| 2019/0266044 A1* | 8/2019 | Gupta | G06F 11/0778 |
| 2020/0081785 A1* | 3/2020 | Chen | G06F 11/302 |

* cited by examiner

SOFTWARE FAULT MONITORING

BACKGROUND

Technical Field

This disclosure relates to monitoring execution of program code, in particular to detecting faults that result unexpected changes in program flow.

Description of the Related Art

Modern computer systems may include multiple processors or processor cores configured to execute software programs or applications. The programs and applications may allow the processors or processor cores to perform a variety of tasks. Such program and applications may be written in may be written in a high-level programming language, such as, e.g., Java™, C, C++, and the like, and then compiled into program code that includes multiple program instructions executable by the processors or processor cores.

Compiled programs or applications may be stored on persistent storage media, such as, e.g., a CD-ROM, for later use. Prior to execution by a computer system, a compiled program or application may be loaded into a memory circuit included in the computer system. In some cases, program code for multiple programs or applications may be loaded into different regions of the memory circuit.

During execution of a particular program code, a processor or processor core may retrieve (or fetch) a given program instruction from the memory circuit. The processor or processor core may then decode the given program instruction, gather any necessary operands needed by the given program instruction. The processor or processor core may then execute the given program instruction and fetch the next program instruction in sequence.

SUMMARY OF THE EMBODIMENTS

Various embodiments of a method for detecting software faults are disclosed. Broadly speaking, a memory circuit may be configured to store program code, that includes a plurality of program instructions, and a plurality of checkpoint data structures. A given checkpoint data structure of the plurality of checkpoint data structures may be associated with a given program instruction of the plurality of program instructions and may be linked to at least one other checkpoint data structure of the plurality of checkpoint data structures. A software fault monitor circuit may be configured to receive a particular checkpoint data structure of the plurality of checkpoint data structures associated with a particular program instruction of the plurality of program instructions and compare the particular checkpoint data structure to a previously received checkpoint data structure of the plurality of checkpoint data structures associated with another program instruction of the plurality of program instructions. The software fault monitor circuit may be further configured to generate a program flow error signal based on results of comparing the checkpoint data structure to the previously received checkpoint data structure.

In another embodiment, a processor circuit may be configured to retrieve the particular program instruction and the particular checkpoint data structure from the memory circuit and send the particular checkpoint data structure to the software fault monitor circuit.

In a non-limiting embodiment, the processor circuit may be further configured to reset in response to a detection of the program flow error.

Figure 1:
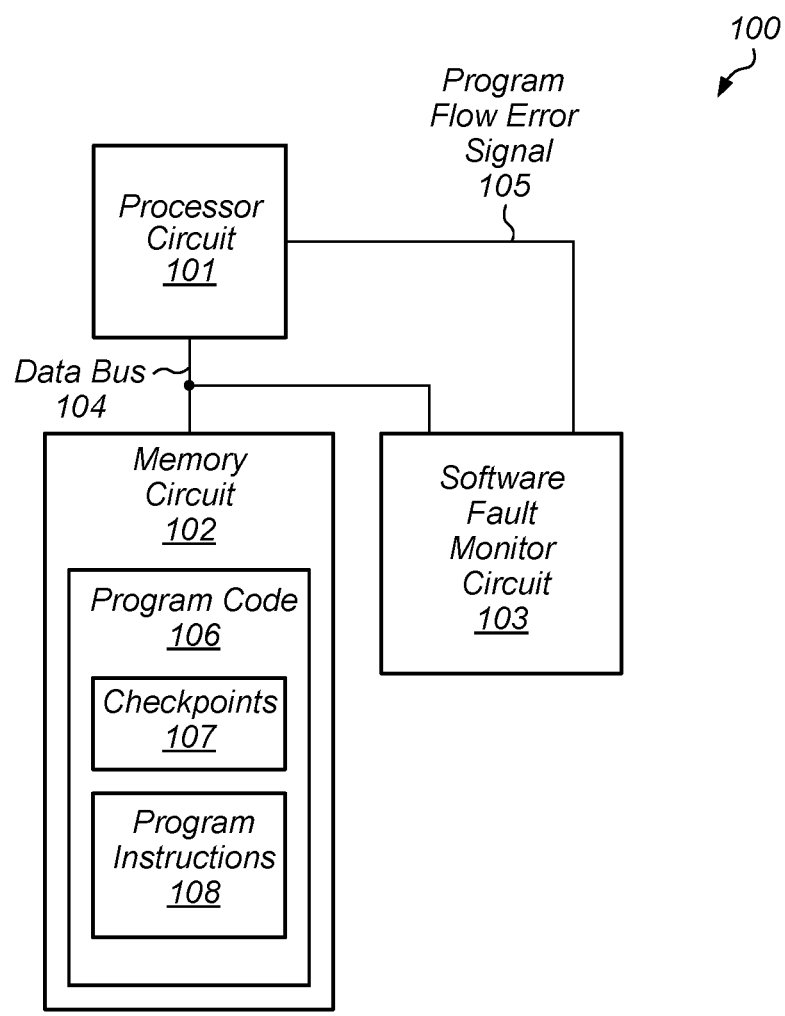
FIG. 1 is a block diagram of an embodiment of a computer system with a software fault monitor circuit.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph (f) interpretation for that unit/circuit/component. More generally, the recitation of any element is expressly intended not to invoke 35 U.S.C. § 112, paragraph (f) interpretation for that element unless the language "means for" or "step for" is specifically recited.

DETAILED DESCRIPTION OF EMBODIMENTS

Computer systems may execute multiple software programs or applications. During execution of such software programs of applications, fault injections may cause undesirable changes in program flow with a software program or application. Such fault injections may be the result of power supply glitches, clock signal glitches, or reset signal glitches. Additionally, electromagnetic pulse injection may also trigger such changes in program flow. In some cases, the fault injections may be generated as part of a deliberate attempt to "hack" the computer system, thereby comprising the security of the computer system.

Fault injection can be particular serious when the computer system is executing code from a secure read-only memory (ROM) or other secure code. Such code has a high-level of trust, and changes in the program flow of such code could allow unsecured access to portions of the computer system. Some computer systems employ redundancy to detect fault injections, but such solutions can be expensive in terms of power consumption and area consumed by the circuitry used to implement the redundancy. The embodiments illustrated in the drawing and described below may provide techniques for monitoring program flow during execution of a software program or application, and detecting unintended changes in program flow, thereby improving the security of the computer system, without the added expense of redundancy.

A block diagram of a computer system that employs a software fault monitor circuit is illustrated in FIG. 1. In the illustrated embodiment, computer system 100 includes processor circuit 101, memory circuit 102, and software fault monitor circuit 103.

Memory circuit 102 is configured to store program code 106, which includes checkpoints 107 and program instructions 108, which includes a plurality of program instructions. As described below in more detail, checkpoints 107 include a plurality of checkpoint data structures linked via shared information. The linked checkpoint data structures form a skeleton of the program flow of program code 106. A given checkpoint data structure of the plurality of checkpoint data structures is associated with a given program instruction of the plurality of program instructions. The given checkpoint data structure is linked to at least one other checkpoint data structure of the plurality of checkpoint data structures.

In various embodiments, memory circuit 102 may be a particular embodiment of a circuit configured to store multiple data bits. For example, memory circuit 102 may include any suitable type of memory circuit such as a Dynamic Random-Access Memory (DRAM), a Static Random-Access Memory (SRAM), a Read-Only Memory (ROM), Electrically Erasable Programmable Read-only Memory (EEPROM), or a non-volatile memory, for example.

Software fault monitor circuit 103 is configured to receive a particular checkpoint data structure of the plurality of checkpoint data structures associated with a particular program instruction of the plurality of program instructions and compare the particular checkpoint data structure to a previously received checkpoint data structure of the plurality of checkpoint data structures associated with another program instruction of the plurality of program instructions. Software fault monitor circuit 103 may be further configured to generate program flow error signal 105 based on results of comparing the checkpoint data structure to the previously received checkpoint data structure.

By comparing the checkpoint data structures surrounding a particular program instruction, software fault monitor circuit can determine if the particular program instruction was executed in the correct order, if an instruction was skipped, or if a double execution was performed on an instruction. To accomplish this, additional details of which are described below, software fault monitor circuit 103 may generate current shared information using the particular checkpoint data structure and generate expected shared information using the previously received checkpoint data structure. If the current shared information matches the expected shared information, i.e., the checkpoint data structures before and after the program instruction are linked, then the program instruction was executed in the proper order. If, however, the current shared information does not match the expected shared information, the program instruction has been executed out of order, and software fault monitor circuit 103 may generate program flow error signal 105.

In various embodiments, software fault monitor circuit 103 may be a particular embodiment of a general-purpose controller, or a dedicated state machine or sequential logic circuit. In other embodiments, software fault monitor circuit may be wholly or partially implemented as a software program executed by processor circuit 101 or any other suitable processor circuit or processor core included in computer system 100.

Processor circuit 101 may be configured to retrieve program instructions from memory circuit 102 via data bus 104 and execute the retrieved program instructions. Additionally, processor circuit 101 may be configured to retrieve the particular program instruction and the particular checkpoint data structure from the memory circuit and send the particular checkpoint data structure to software fault monitor circuit 103 via data bus 104. Processor circuit 101 may be configured to reset in response to a detection of program flow error signal 105.

In various embodiments, processor circuit 101 may be a particular embodiment of a general-purpose processor that performs computational operations. For example, processor circuit 101 may be a central processing unit (CPU) such as a microprocessor, a microcontroller, an application-specific integrated circuit (ASIC), or a field-programmable gate array (FPGA).

It is noted that the embodiment depicted in the block diagram of FIG. 1 is merely an example. In other embodiments, additional circuit blocks, such as input/output circuits configured receive data from another computer system, may be included.

Figure 2:
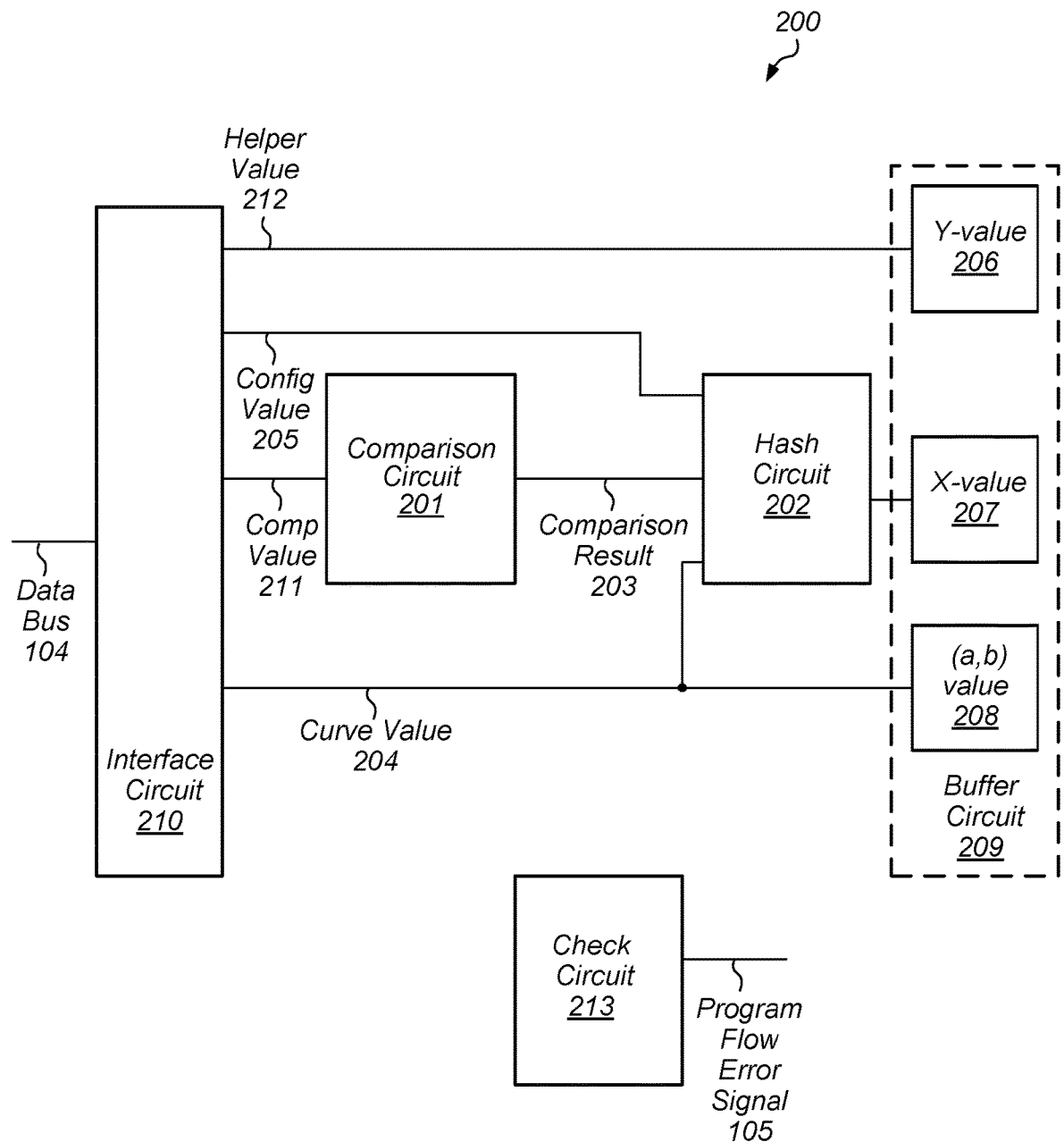
FIG. 2 illustrates a block diagram of software fault monitor circuit.

An embodiment of a software fault monitor circuit is illustrated in the block diagram of FIG. 2. Software fault monitor circuit 200 may, in various embodiments, correspond to software fault monitor circuit 103. In the illustrated embodiment, software fault monitor circuit 200 includes interface circuit 210, comparison circuit 201, hash circuit 202, buffer circuit 209, and check circuit 213.

Interface circuit 210 is configured to receive a checkpoint data structure via data bus 104. In various embodiments, data may be transmitted on data bus 104 according to a communication protocol that includes requests and responses (collectively transactions). In such cases, interface circuit 210 may be configured to receive such requests, remove the data payload, i.e., the checkpoint data structure, and issue any necessary response to the initiator of the request. Interface circuit 210 may also isolate and temporarily buffer or store the components of the checkpoint data structure, i.e., helper value 212, config value 205, comp value 211, and curve value 204.

Comparison circuit 201 may include two sets of operand registers (not shown). Each set consists of 48 a-bit registers used to store properties and 16 32-bit registers used to store general-purpose data, for a total of 64 pairs of registers. Comparison circuit 201 is, based on comp value 211, configured to compare the contents of each pair of registers to generate two bits of the total 128 bits of comparison result 203.

In addition to the aforementioned registers, comparison circuit 201 includes multiple bitwise comparison circuits coupled to the registers. Such bitwise comparison circuits may include, in various embodiments, exclusive-OR gates or any other suitable circuit capable of comparing logic values of two data bits.

Hash circuit 202 is configured to generate X-value 207 using config value 205, comparison result 203, and curve value 204. In various embodiments, hash circuit 202 may be configured to generate a 64-bit message authentication code (commonly referred to as a "MAC"). Hash circuit 202 may be further configured to perform an exclusive-OR operation using the higher 32-bits and the lower 32-bits of the MAX to generate X-value 207.

Buffer circuit 209 is configured to store Y-value 206, X-value 207, and (a, b) value 208. Y-value 206 and (a, b) value 208 may be copied from helper value 212 and curve value 204. In various embodiments, buffer circuit 209 may include any suitable type of data storage circuits, such as, e.g., SRAM data storage cells, latch circuits, flip-flop circuits, and the like.

It is noted that although only single copies of comparison circuit 201 and hash circuit 202 are illustrated, in other embodiments multiple copies of these circuits may be employed to allow for the determination of the current shared information using the particular checkpoint data structure and the expected shared information using the previously received checkpoint data structure, in parallel.

As described below in more detail in regard to FIG. 6, check circuit 213 may use X-value 207 and Y-value 206 to determine if the current shared information matches the expected shared information. This is accomplished by using by combining X-value 207, and the values a and b from the previously received checkpoint data structure according to Equation 1 and determining if the result is the same as Y-value 206. If the result is the same, then no fault is detected. If the result of the calculation is not the same, then check circuit 213 generates program flow error signal 105. It is noted that the use of Equation 1 is a particular embodiment of generating a checkpoint based on values from a checkpoint data structure and that, in other embodiments, different equations such as, e.g., equations relating to Galois fields or polynomial fields, may be employed.

$$Y=aX+b \pmod{2^{32}} \tag{1}$$

Although software fault monitor circuit 200 is depicted as including depicted as including several circuit blocks, in other embodiments, software fault monitor circuit 200 may be implemented as a general-purpose processor executing program instructions.

As described above, software fault monitor circuit relies upon checkpoint data structures embedded within the code of a software program or application to determine if the order of execution of the software program or application is correct. An embodiment of such a data structure is depicted in the block diagram of FIG. 3. In the illustrated embodiment, checkpoint data structure 300 includes curve value 301, comp value 302, config value 303, and helper value 304.

Config value 303 may, in various embodiments, include four 32-bit data words of information indicative of the computer system's configuration requirements, while curve value 301 includes two 32-bit words that link one checkpoint data structure to another checkpoint data structure. As described below in more detail, helper value 304 may include a single 32-bit data word that is used to assist in the generation of expected shared information for a current checkpoint data structure to compare against shared information for a previous checkpoint data structure.

Comp value 302 may include data indicative of a comparison condition for each pair of registers included in comparison circuit 201 as illustrated in FIG. 2. For example, a value of 000 indicates a disabled condition. In various embodiments, comp value 302 may be used to detect invalid branch decisions due to fault injections. Comp value 302 may include two parts: comparison target and comparison object. These two parts represent the two arguments used to decide which branch to choose. As described above, the result of the comparison, i.e., comparison result 203, may be used to generate X-value 207. Every branch has a unique expectation on the comparison result. If an injected fault forces the software to choose an invalid branch, the unexpected comparison result will not generate a point on the curve. Different branches generate different X coordinates for the curve due to comparison results and different configuration operations.

Figure 3:
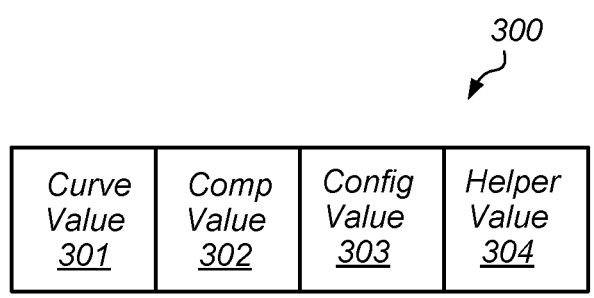
FIG. 3 illustrates a block diagram of a checkpoint data structure.

Although only four fields are depicted in the embodiment of FIG. 3, in other embodiments, additional fields may be included to allow for different curve equations.

Figure 4:
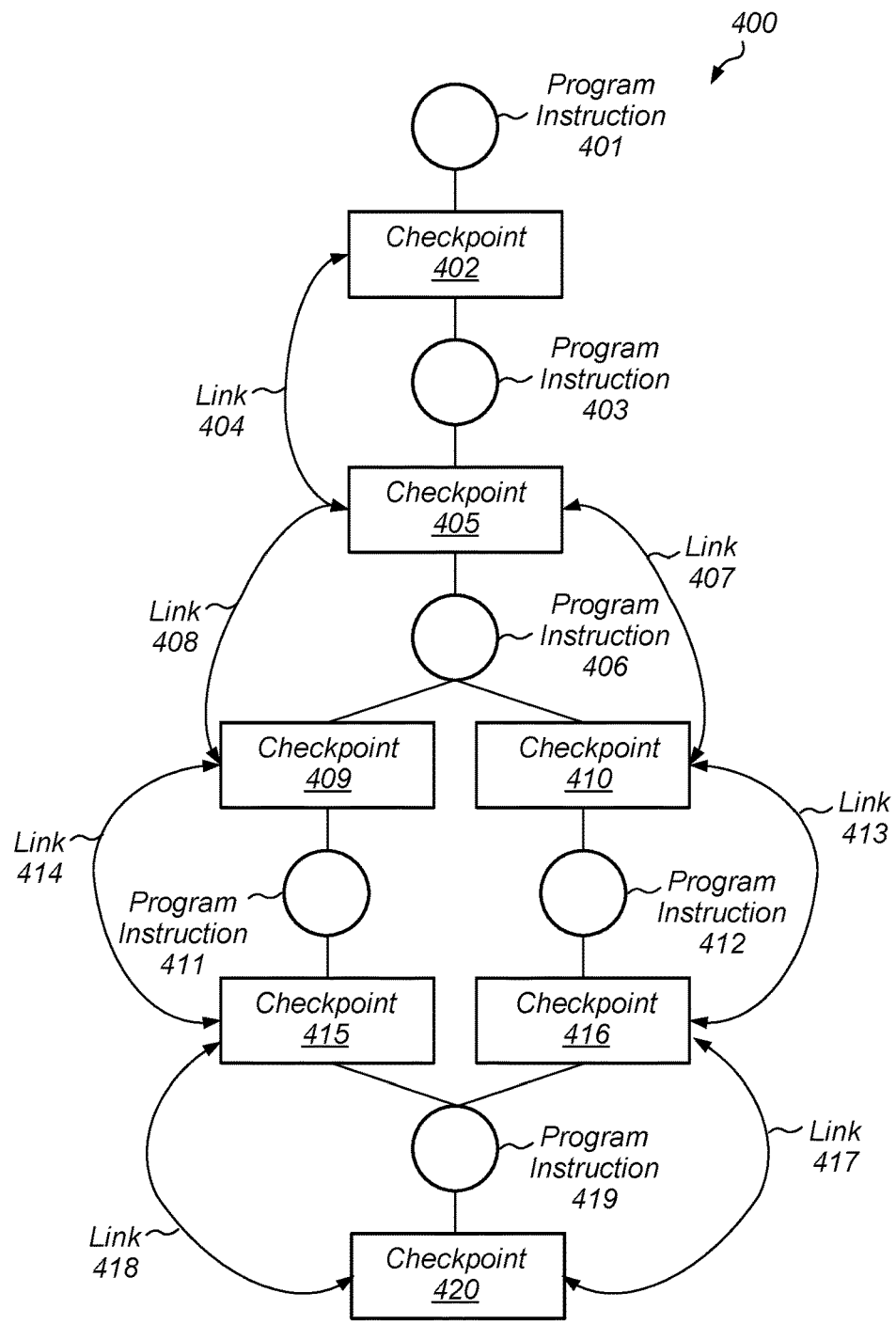
FIG. 4 illustrates a block diagram depicting a software program that includes checkpoints.

A block diagram of a software program that includes checkpoints is illustrated in FIG. 4. In the illustrated embodiment, software program 400 includes program instruction 401, program instruction 403, program instruction 406, program instruction 411, program instruction 412, and program instruction 419. Software program 400 further includes checkpoint 402, checkpoint 405, checkpoint 409, checkpoint 410, checkpoint 415, checkpoint 416, and checkpoint 420, each linked to other checkpoints via shared information in data structures associated with their respective checkpoint.

The aforementioned checkpoints are linked and arranged between program instructions in software program 400 to allow for a determination, by a software fault monitor circuit, such as, e.g., software fault monitor circuit 103, if the program instructions are executed in the correct order. As a given program instruction is executed, an associated checkpoint data structure is stored in the software fault monitor circuit, which generates shared information based on the checkpoint data structure. The software fault monitor circuit may then compare the generated shared information to expected shared information, which is based on a previously received checkpoint data structure.

If the checkpoint data structure and the previously received checkpoint data structure are linked, then the generated shared information and the expected shared information should match, indicating that the given program instruction was the expected program instruction. If, however, a program instruction was executed out-of-order, then the subsequently loaded checkpoint data structure will not be linked to the previously received checkpoint data structure. As a result, the generated shared information and the expected shared information will not match, and the software fault monitor circuit will signal an error.

Once a software program or application is written, checkpoints may be inserted into the code. In some cases, a programmer may specify the location of checkpoints within the code, while in other cases, a development tool or script may analyze the software program or application, and then insert the checkpoints based on results of the analysis.

Program instruction 401 is followed by checkpoint 402, and program instruction 403 is followed by checkpoint 405. Checkpoint 402 and checkpoint 405 are linked via link 404. It is noted that such a link may be accomplished using shared information included in respective data structures for two linked checkpoints.

During normal operation, after execution of the program instruction 401, a data structure associated with checkpoint 402 is stored in the software fault monitor circuit, and after execution of program instruction 403, a data structure associated with checkpoint 405 is stored in the software fault monitor circuit. As described below in more detail, the software fault monitor circuit may then determine if the sequence of program instruction 401 followed by program instruction 403 is correct by comparing information included in the linked checkpoints 402 and 405. If, for example, an out-of-sequence program instruction had been executed after program instruction 401, then a different checkpoint would be loaded into the software fault monitor circuit. The information included in the different checkpoint's data structure would result in the detection of an error compared to data structure of checkpoint 402, since the two data structure are not linked.

The use of checkpoints, as described above, also supports branch instructions, function calls, and other instructions that intentionally change the execution order of software instructions. For example, program instruction 406 is a branch (or fork) instruction with two possible outcomes, namely, program instruction 411 and program instruction 412. In order to account for the two possible outcomes, checkpoints are added into each branch. As described above, comp values, such as, e.g., comp value 302, associated with each of checkpoint 409 and checkpoint 410 can be used to determine if program instruction 406 has branched to an invalid branch.

Following the execution of program instruction 406, data structures associated with checkpoints 409 and 410 are stored in the fault monitor circuit. Both checkpoint 409 and checkpoint 410 are linked to checkpoint 405, to ensure that program instruction 406 is executed in the proper sequence.

Depending on the outcome of program instruction 406, either program instruction 411 or program instruction 412 will be executed. Program instruction 411 is followed by checkpoint 415, which is linked to checkpoint 409. Program instruction 412 is followed by checkpoint 416, which is linked to checkpoint 410. The software fault monitor circuit can use the data structures of checkpoint 409 and checkpoint 415 to make verify that program instruction 411 was executed and not some other instruction. In a similar fashion, the execution of program instruction 412 can be verified.

Program instruction 419 depicts a merge, where multiple branches merge into a single trunk. Each branch merging into a trunk has separate helper values, such as helper value 304, for example. The trunk, in this case, program instruction 419, sets the X-coordinate for the curve, while each of the branches set a different helper value to ensure the point determined using checkpoint 420 lies on the curve.

Since program instruction 419 is a merge, the execution of program instruction 419 will follow the execution of either program instruction 411 or program instruction 412. To verify that program instruction 419 is executed in the correct order, checkpoint 420 is linked to both checkpoint 415 and checkpoint 416. If program instruction 419 is executed, then the data structure of checkpoint 420 will be loaded into the software fault monitor circuit, which will verify the execution of program instruction 419 since checkpoint 420 is linked to both checkpoint 415 and 416. If some other instruction is executed in place of program instruction 419, shared information in a subsequently loaded data structure will not match the shared information in either checkpoint 415 or checkpoint 416 since the subsequently loaded data structure would not be linked.

Although not explicitly depicted in the diagram of FIG. 4, function calls may also be handled using checkpoints. A function call is a combination of a branch and a merge, where calling the function is a merge, and exiting the function is a fork. As such, by adding fork and branch checkpoints, the program flow of function calls may also be monitored.

It is noted that the software program depicted in the block diagram of FIG. 4 is merely an example and, in other embodiments, different numbers of program instructions and checkpoints may be employed.

Figure 5:
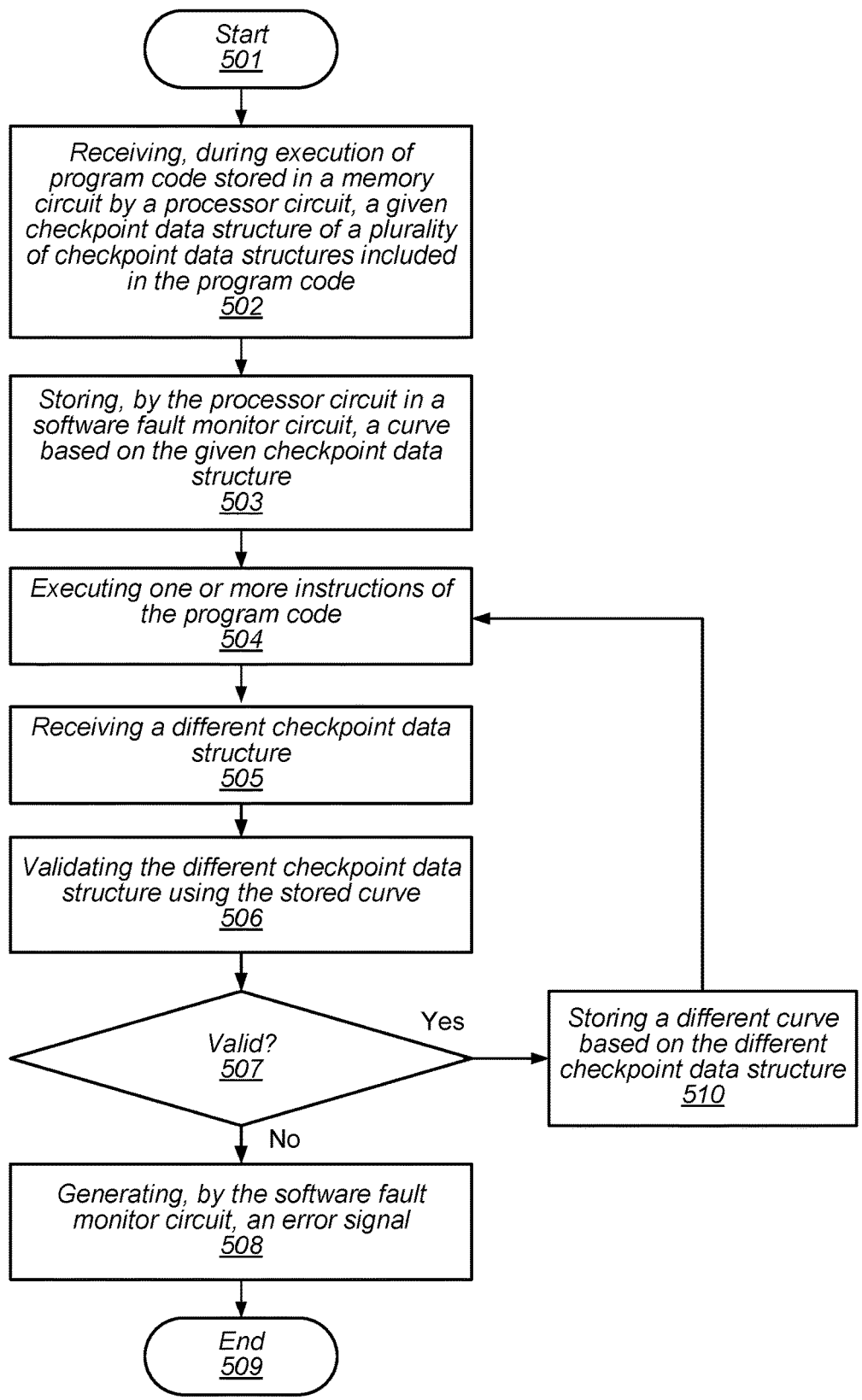
FIG. 5 illustrates a flow diagram depicting an embodiment of a method for monitoring software execution using checkpoints.

Turning to FIG. 5, a flow diagram depicting an embodiment of a method for monitoring execution, by a computer system, of software using checkpoints is illustrated. Referring collectively to the block diagram of FIG. 1, and the flow diagram of FIG. 5, the method begins in block 501.

The method includes receiving, during execution of program code stored in a memory circuit by a processor circuit, a given checkpoint data structure of a plurality of checkpoint data structures included in the program code (block 502). In various embodiments, certain of the checkpoint data structures of the plurality of checkpoint data structures may be linked to other checkpoint data structures of the plurality of checkpoint data structures. Any linked checkpoint data structures may share certain data or information.

The method further includes storing, by the processor circuit a curve based on the given checkpoint data structure in a software fault monitor circuit (block 503). In some cases, the software fault monitor circuit may be coupled to a data bus shared between the processor circuit and the memory circuit. The processor circuit may issue a command to write the given checkpoint data structure to an address corresponding to the software fault monitor circuit.

The method also includes executing one or more instructions of the program code (block 504). As described above, the program code may include multiple checkpoint data structures. Between any two of the checkpoint data structures, there may be at least one instruction of the program code to be executed by the processor circuit. In some cases, checkpoint data structures may be included between each instruction in the program code.

The method further includes receiving a different checkpoint data structure (block 505). The different checkpoint data structure is included in the program code after the previously mentioned one or more instructions. In various embodiments, the different checkpoint data structure is linked to the given checkpoint data structure by shared information.

The method also includes validating the different checkpoint data structure using the stored curve (block 506). As described below in more detail, the software fault monitor circuit may generate shared information using the different checkpoint data structure and compare the generated shared information against the stored curve, which includes expected shared information specified by the given checkpoint data structure. The method may then depend on whether the different checkpoint is valid (block 507).

If the different checkpoint is valid, then the method includes storing a different curve based on the different checkpoint data structure (block 510). In a similar fashion to the given checkpoint data structure, data associated with the different checkpoint data structure, which may include shared information with another checkpoint located elsewhere within the program code, may be stored in the software fault monitor circuit. Once the different curve has been stored, the method may continue from block 504 as described above.

Alternatively, if the different checkpoint is not valid, then the method includes generating, by software fault monitor circuit, an error signal (block 508). When the generated shared information and the expected shared information do not match, then the checkpoint data structures cannot be linked, indication that the most recently executed program instruction is not the program instruction that was expected to be executed. As described below in more detail, the computer system may then perform one or more operations in response to detecting the generated error signal. The method may conclude in block 509.

It is noted that the embodiment of the method illustrated in the flow diagram of FIG. 5 is merely an example. In other embodiments, different orders of operations may be employed.

In order to compare to generated shared information and expected shared information, a software fault monitor circuit may calculate a point on a curve using a current checkpoint data structure, and the compare the calculated point to the curve defined in a previously received checkpoint. An embodiment of method for performing the comparison is illustrated in the flow diagram of FIG. 6. The method depicted in the flow diagram of FIG. 6 may correspond to blocks 504 and 505 of the method of FIG. 5 and begins in block 601.

The software fault monitor circuit may then generate a first coordinate using information included in the given checkpoint data structure (block 602). To generated the first coordinate, the software fault monitor circuit may combine various fields in the given checkpoint data structure, such as, e.g., checkpoint data structure 300 as illustrated in FIG. 4. For example, the software fault monitor circuit may perform a hash operation on the curve value and the config value included in the given checkpoint data structure to generate a message authentication code (commonly referred to as a "MAC"). In some cases, portions of the MAC may be combined to generate the first coordinate. For example, the higher order bits of the MAC may be combined with the lower order bits of the MAC using an exclusive-OR operation to generate the first coordinate.

The software fault monitor circuit may then generate a second coordinate using the information included in the given checkpoint data structure (block 603). The second coordinate may, in some embodiments, be directly read from the given checkpoint data structure. For example, a helper value, such as, e.g., helper value 304, may be used as the second coordinate. In other embodiments, the helper value may be operated upon by the software fault monitor circuit or combined with other values to determine the second coordinate.

The software fault monitor circuit may then compare the first and second coordinates to a curve specified by the previously received checkpoint data structure (block 604). Using the first and second coordinates, the software fault monitor circuit may check these values against a curve defined by the previously received checkpoint data structure. In various embodiments, Equation 1 may specify the curve, where a and b are included the curve value of the previously received checkpoint data structure. The first and second coordinates form a point (X,Y). The point is then checked to see if it satisfies the current curve as defined by the previously received checkpoint data structure. In some cases, the software data structure may evaluate equation using the values of a, b, X, and Y to determine if Equation 1 holds true. The method may then depend results of the comparison (block 605).

If the calculated coordinates lie on the curve specified by the previously received checkpoint data structure, then the execution flow of the program is as expected and the given checkpoints values are then used to define the curve for the next checkpoint that is received. The method concludes in block 607.

Alternatively, it the calculated coordinates do not lie on the curve specified by the previously received checkpoint data structure, identifying a fault (block 606). When the calculated points do not lie on the specified curve, an instruction included the software program or application has been executed out of sequence. Such out of order execution, may signal a security breach or other program with the computer system. The method then concludes in block 607.

Figure 6:
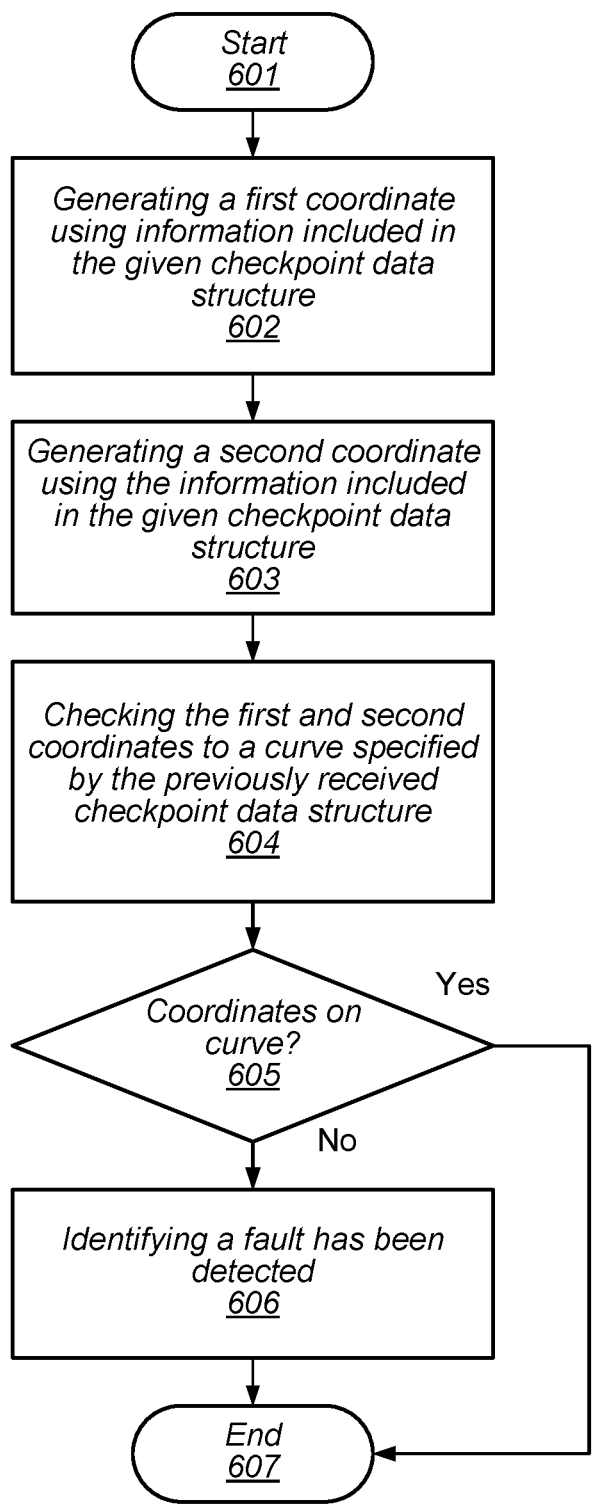
FIG. 6 illustrates a flow diagram depicting an embodiment of a method for comparing two linked checkpoints included in a software program.

It is noted that the method illustrated in the flow diagram of FIG. 6 is merely an example. In other embodiments, different operations and different orders of operations are possible and contemplated.

As described above, a software fault monitor circuit in a computer system may generate an error signal in response to detecting an error in execution of a software program or application. When this occurs, the computer system may response in a variety of ways to the error signal. An embodiment of a method for a computer system to respond to an error signal is illustrated in the flow diagram of FIG. 7. The method begins in block 701.

In response to the error signal generated by the software fault monitor circuit, a clock signal to a processor circuit, such as, e.g., processor circuit 101, or processor core circuit may be stopped (block 702). As used and described herein, a clock signal is a signal that is period while active and used as a timing reference for one or more circuit blocks. In various embodiments, a clock generation circuit, such as described below in regard to FIG. 8, may generate multiple clock signals of varying frequencies for use within a computer system. Upon detection of the error signal generated by the software fault monitor circuit, the clock generation circuit may stop or halt on or more of the clock signals using by the processor circuit. By stopping clock signals used by the processor circuit in this fashion, the processor circuit is prevented from executing what could be malicious program code, thereby improving the security of the computer system.

The clock generation circuit may then resume operation of the clock signal for the processor circuit in response to receiving a reset indication (block 703). The reset indication may be generated in a variety of ways. For example, the reset indication may be generated after a period of time has elapsed, or in response to receiving input from a user indicating that it is safe to resume operation. Once the clock generation receives the reset indication, the clock signal to the processor may be restarted.

Figure 7:
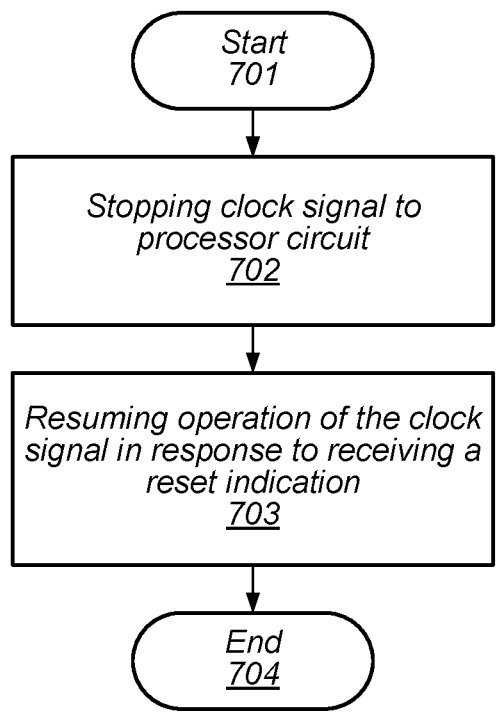
FIG. 7 illustrates a flow diagram depicting an embodiment of a method for responding to an error signal generated by a software fault monitor circuit.

It is noted that the embodiment described in FIG. 7 is merely an example. In other embodiments, the computer system may take other actions, such as, e.g., a complete shutdown by performing a power down operation, in response to detecting the error signal.

Figure 8:
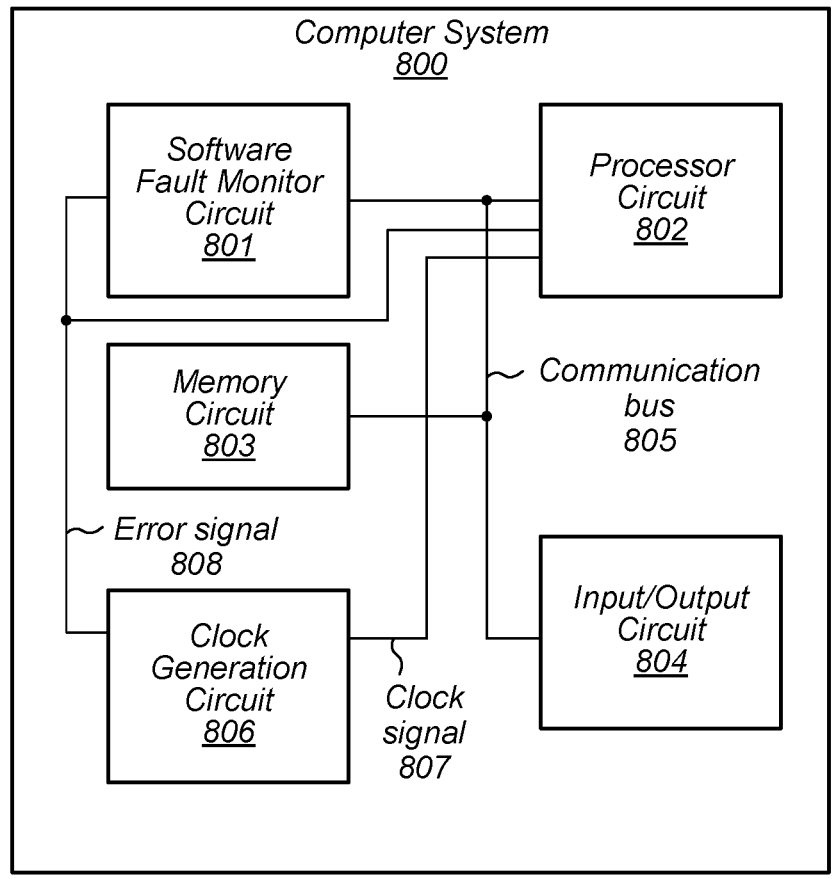
FIG. 8 is a block diagram of an embodiment of a computer system.

A block diagram of computer system is illustrated in FIG. 8. In the illustrated embodiment, the computer system 800 includes software fault monitor circuit 801, processor circuit 802, input/output circuits 804, and memory circuit 803, each of which is coupled to communication bus 805. Computer system 800 also includes clock generation circuit 806. In various embodiments, computer system 800 may be configured for use in a desktop computer, server, or in a mobile computing application such as, e.g., a tablet, laptop computer, or wearable computing device.

Software fault monitor circuit 801 may be configured to analyze and compare checkpoints in a software program included stored memory circuit 803. In various embodiments, may correspond to software fault monitor circuit 103 as illustrated in the embodiment of FIG. 1. In response to detection of an error in execution of the software program, software fault monitor circuit 801 may send error signal 808 to processor circuit 802 and/or clock generation circuit 806. Although depicted as a separate signal, in some embodiments, error signal 808 may be sent as an encoded message via communication bus 805. Although only a single software fault monitor circuit is illustrated in the embodiment of FIG. 8, in other embodiment, multiple software fault monitor circuits may be employed.

Clock generation circuit 806 is configured to generate clock signal 807 for processor circuit 802. Although clock generation circuit 806 is depicted as generating a single clock signal, in other embodiments, clock generation circuit 806 may generate multiple clock signals, which may have different frequencies. In various embodiments, clock generation circuit 806 may include crystal oscillator circuit, voltage-controlled oscillator circuits, phase-locked loops, frequency-locked loops, and any other circuit suitable for generating a clock signal.

Processor circuit 802 may, in various embodiments, be representative of a general-purpose processor that performs computational operations. For example, processor circuit 802 may be a central processing unit (CPU) such as a microprocessor, a microcontroller, an application-specific integrated circuit (ASIC), or a field-programmable gate array (FPGA).

Memory circuit 803 may in various embodiments, include any suitable type of memory such as a Dynamic Random-Access Memory (DRAM), a Static Random-Access Memory (SRAM), a Read-Only Memory (ROM), Electrically Erasable Programmable Read-only Memory (EEPROM), or a non-volatile memory, for example. It is noted that in the embodiment of an integrated circuit illustrated in FIG. 8, a single memory circuit is depicted. In other embodiments, any suitable number of memory circuits may be employed. For example, in some computer system, a secure ROM may be included that stores code for secure operations, such as boot-up or power-on, for example.

Input/output circuits 804 may be configured to coordinate data transfer between computer system 800 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, input/output circuits 804 may be configured to implement a version of Universal Serial Bus (USB) protocol or IEEE 1394 (Firewire®) protocol.

Input/output circuits 804 may also be configured to coordinate data transfer between computer system 800 and one or more devices (e.g., other computing systems or integrated circuits) coupled to computer system 800 via a network. In one embodiment, input/output circuits 804 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, input/output circuits 804 may be configured to implement multiple discrete network interface ports.

It is noted that the embodiment of FIG. 8 is merely an example. In other embodiments, computer system 800 may include additional circuit blocks, such as, e.g., power management circuit blocks, and the like.

Figure 9:
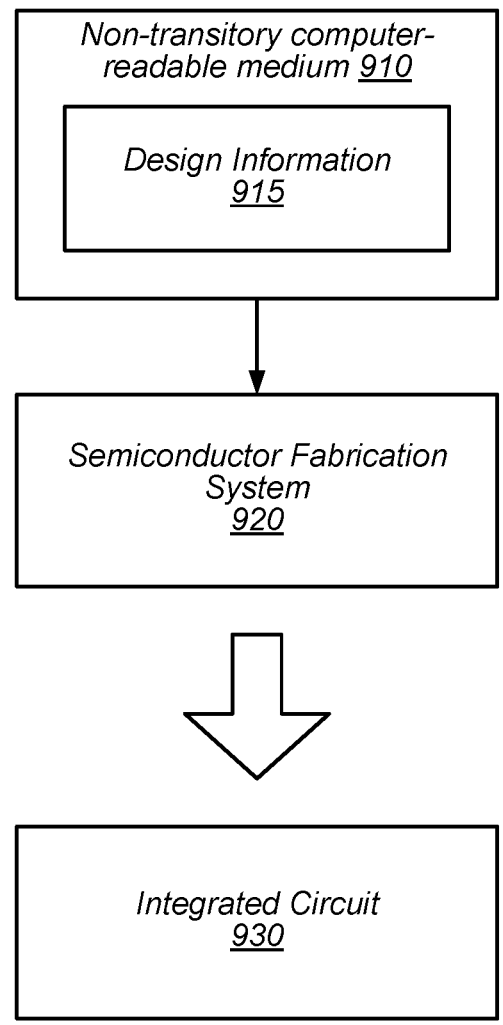
FIG. 9 is a block diagram of a computer-readable medium storing design information for an integrated circuit.

FIG. 9 is a block diagram illustrating an example non-transitory computer-readable storage medium that stores circuit design information, according to some embodiments. In the illustrated embodiment, semiconductor fabrication system 920 is configured to process the design information 915 stored on non-transitory computer-readable storage medium 910 and fabricate integrated circuit 930 based on the design information 915.

Non-transitory computer-readable storage medium 910, may comprise any of various appropriate types of memory devices or storage devices. Non-transitory computer-readable storage medium 910 may be an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 910 may include other types of non-transitory memory as well or combinations thereof. Non-transitory computer-readable storage medium 910 may include two or more memory mediums which may reside in different locations, e.g., in different computer systems that are connected over a network.

Design information 915 may be specified using any of various appropriate computer languages, including hardware description languages such as, without limitation: VHDL, Verilog, SystemC, SystemVerilog, RHDL, M, MyHDL, etc. Design information 915 may be usable by semiconductor fabrication system 920 to fabricate at least a portion of integrated circuit 930. The format of design information 915 may be recognized by at least one semiconductor fabrication system, such as semiconductor fabrication system 920, for example. In some embodiments, design information 915 may include a netlist that specifies elements of a cell library, as well as their connectivity. One or more cell libraries used during logic synthesis of circuits included in integrated circuit 930 may also be included in design information 915. Such cell libraries may include information indicative of device or transistor level netlists, mask design data, characterization data, and the like, of cells included in the cell library.

Integrated circuit 930 may, in various embodiments, include one or more custom circuit blocks or macrocells, such as memories, analog or mixed-signal circuits, software fault monitor circuits, and the like. In such cases, design information 915 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 920 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 920 may also be configured to perform various testing of fabricated circuits for correct operation.

In various embodiments, integrated circuit 930 is configured to operate according to a circuit design specified by design information 915, which may include performing any of the functionality described herein. For example, integrated circuit 930 may include any of various elements shown or described herein. Further, integrated circuit 930 may be configured to perform various functions described herein in conjunction with other components. Further, the functionality described herein may be performed by multiple connected integrated circuits.

As used and described herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A system, comprising:
a memory circuit configured to store program code, wherein the program code includes a plurality of program instructions, and a plurality of checkpoint data structures, wherein a given checkpoint data structure of the plurality of checkpoint data structures is associated with a given program instruction of the plurality of program instructions, and wherein the given checkpoint data structure is linked, via shared information specified in the program code, to at least one other checkpoint data structure of the plurality of checkpoint data structures; and
a software fault monitor circuit configured to:
receive a particular checkpoint data structure of the plurality of checkpoint data structures associated with a particular program instruction of the plurality of program instructions;
compare the particular checkpoint data structure to a previously received checkpoint data structure of the plurality of checkpoint data structures associated with another program instruction of the plurality of program instructions; and
generate a program flow error signal based on results of comparing the checkpoint data structure to the previously received checkpoint data structure.

2. The system of claim 1, further comprising a processor circuit configured to retrieve the particular program instruction and the particular checkpoint data structure from the memory circuit and send the particular checkpoint data structure to the software fault monitor circuit.

3. The system of claim 2, wherein the processor circuit is further configured to reset in response to a detection of the program flow error signal.

4. The system of claim 1, wherein to compare the particular checkpoint data structure to the previously received checkpoint data structure, the software fault monitor circuit is further configured to generate a current value of the shared information using the particular checkpoint data structure and generate an expected value of the shared information using the previously received checkpoint data structure.

5. The system of claim 4, wherein the current value of the shared information includes a point specified by a first coordinate and a second coordinate, and wherein the software fault monitor circuit is further configured to determine whether the point lies on a curve that is based on the expected value of the shared information.

6. The system of claim 5, wherein the software fault monitor circuit is further configured to generate the first coordinate using system configuration information.

7. A method, comprising:
receiving, by a processor circuit, during execution of program code stored in a memory circuit, a given checkpoint data structure of a plurality of checkpoint data structures included in the program code, wherein the given checkpoint data structure is linked, via shared information specified in the program code, to a different checkpoint data structure of the plurality of checkpoint data structures;
storing, by the processor circuit in a software fault monitor circuit, a curve based on the given checkpoint data structure;
executing, by the processor circuit, one or more instructions of the program code;
receiving, by the processor circuit, the different checkpoint data structure;
validating the different checkpoint data structure using the stored curve; and
generating, by the software fault monitor circuit, an error signal based on results of validating the different checkpoint data structure.

8. The method of claim 7, further comprising, stopping a clock signal used the processor circuit by a clock generation circuit, in response to detection of the error signal.

9. The method of claim 7, further comprising, resetting the processor circuit in response to detection of the error signal.

10. The method of claim 7, wherein validating the different checkpoint data structure, includes generating a current value for the shared information using the different checkpoint data structure and generating an expected value for the shared information using the given checkpoint data structure.

11. The method of claim 10, wherein the current value of the shared information includes a point specified by a first coordinate and a second coordinate, and further comprising determining whether the point lies on a curve that is based on the expected value of the shared information.

12. The method of claim 11, wherein the given checkpoint data structure includes a plurality of fields, and wherein a given field of the plurality of fields includes system configuration information.

13. The method of claim 12, further comprising, generating the first coordinate by performing a hash function using at least the system configuration information.

14. A non-transitory computer-readable storage medium having design information stored thereon, wherein the design information specifies a design of at least a portion of a hardware integrated circuit in a format recognized by a semiconductor fabrication system that is configured to use the design information to produce the hardware integrated circuit according to the design information, wherein the design information specifies that the hardware integrated circuit comprises:
- a memory circuit configured to store program code, wherein the program code includes a plurality of program instructions, and a plurality of checkpoint data structures, wherein a given checkpoint data structure of the plurality of checkpoint data structures is associated with a given program instruction of the plurality of program instructions, and wherein the given checkpoint data structure is linked, via shared information specified in the program code, to at least one other checkpoint data structure of the plurality of checkpoint data structures; and
- a software fault monitor circuit configured to:
  - receive a particular checkpoint data structure of the plurality of checkpoint data structures associated with a particular program instruction of the plurality of program instructions;
  - compare the particular checkpoint data structure to a previously received checkpoint data structure of the plurality of checkpoint data structures associated with another program instruction of the plurality of program instructions; and
  - generate a program flow error signal based on results of comparing the checkpoint data structure to the previously received checkpoint data structure.

15. The non-transitory computer-readable storage medium of claim 14, wherein the hardware integrated circuit further comprises a processor circuit configured to retrieve the particular program instruction and the particular checkpoint data structure from the memory circuit and send the particular checkpoint data structure to the software fault monitor circuit.

16. The non-transitory computer-readable storage medium of claim 15, wherein the processor circuit is further configured to reset in response to a detection of the program flow error signal.

17. The non-transitory computer-readable storage medium of claim 16, wherein the hardware integrated circuit further comprises a clock generation circuit configured to generate stop a clock signal used by the processor circuit, in response to a detection of the program flow error signal.

18. The non-transitory computer-readable storage medium of claim 14, wherein to compare the particular checkpoint data structure to the previously received checkpoint data structure, the software fault monitor circuit is further configured to generate a current value for the shared information using the particular checkpoint data structure and generate an expected value of the shared information using the previously received checkpoint data structure.

19. The non-transitory computer-readable storage medium of claim 18, wherein the current value of the shared information includes a point specified by a first coordinate and a second coordinate, and wherein the software fault monitor circuit is further configured to determine whether the point lies on a curve that is based on the expected value of the shared information.

20. The non-transitory computer-readable storage medium of claim 19, wherein the software fault monitor circuit is further configured to generate the first coordinate using system configuration information.

* * * * *